(12) United States Patent
Eriksson et al.

(10) Patent No.: US 11,660,765 B2
(45) Date of Patent: May 30, 2023

(54) METHOD FOR RECOVERY OF A FRICTIONAL BRAKE DEVICE, INDUSTRIAL DEVICE AND CONTROL SYSTEM

(71) Applicant: ABB Schweiz AG, Baden (CH)

(72) Inventors: Daniel Eriksson, Västerås (SE); Görgen Johansson, Västerås (SE); Klas X Forsberg, Västerås (SE); Josef Holmner, Umeå (SE)

(73) Assignee: ABB Schweiz AG, Baden (CH)

( * ) Notice: Subject to any disclaimer, the term of this patent is extended or adjusted under 35 U.S.C. 154(b) by 519 days.

(21) Appl. No.: 16/958,984

(22) PCT Filed: Feb. 21, 2018

(86) PCT No.: PCT/EP2018/054211
§ 371 (c)(1),
(2) Date: Jun. 29, 2020

(87) PCT Pub. No.: WO2019/161890
PCT Pub. Date: Aug. 29, 2019

(65) Prior Publication Data
US 2020/0331152 A1  Oct. 22, 2020

(51) Int. Cl.
*B25J 19/00* (2006.01)

(52) U.S. Cl.
CPC .................. *B25J 19/0004* (2013.01)

(58) Field of Classification Search
CPC .................. B25J 19/0004; B25J 9/1674
See application file for complete search history.

(56) References Cited

U.S. PATENT DOCUMENTS 3,752,267 A   8/1973   Dovell et al.
4,476,965 A   10/1984  Brown et al.
(Continued)

FOREIGN PATENT DOCUMENTS

EP   0462675 A1   12/1991
EP   1215475 A2   6/2002
(Continued)

OTHER PUBLICATIONS

International Search Report and Written Opinion of the International Searching Authority Application No. PCT/EP2018/054211 Completed: Nov. 9, 2018; dated Nov. 21, 2018 8 pages.

(Continued)

*Primary Examiner* — Jake Cook
(74) *Attorney, Agent, or Firm* — Whitmyer IP Group LLC

(57) ABSTRACT

A method for recovery of a frictional brake device of an industrial device, the method including executing a recovery operation, the recovery operation including at least one movement of a second member of the industrial device relative to a first member of the industrial device, while engaging the brake device to apply braking energy to the movement; monitoring an actual value related to braking energy of the brake device during the recovery operation, the actual value being not related to speed of the movement; and stopping the recovery operation when the actual value reaches the at least one target value. An industrial device is also provided.

17 Claims, 2 Drawing Sheets

(56) References Cited

U.S. PATENT DOCUMENTS

| | | | |
|---|---|---|---|
| 8,069,714 B2 * | 12/2011 | Ortmaier | B25J 13/085 73/121 |
| 8,686,670 B2 * | 4/2014 | Verheyen | H02P 3/04 318/432 |
| 9,446,517 B2 | 9/2016 | Burns et al. | |
| 9,537,431 B2 | 1/2017 | Sawamura et al. | |
| 9,579,805 B2 | 2/2017 | Tsai et al. | |
| 2002/0069697 A1 | 6/2002 | Hofmann | |
| 2009/0145699 A1 * | 6/2009 | Jonsson | F16D 66/02 188/1.11 E |
| 2017/0066442 A1 | 3/2017 | Woodley | |

FOREIGN PATENT DOCUMENTS

| | | |
|---|---|---|
| EP | 1215475 B1 | 6/2006 |
| EP | 1905552 A1 | 4/2008 |

OTHER PUBLICATIONS

International Preliminary Report of Patentability; Application No. PCT/EP2018/054211; dated Aug. 27, 2020; 6 Pages.
Chinese Office Action; Application No. 2021070902377440; dated Jul. 14, 2021; 13 Pages.
Second Chinese Office Action: Application No. 2018800877503; dated Mar. 14, 2022; 16 Pages.

* cited by examiner

METHOD FOR RECOVERY OF A FRICTIONAL BRAKE DEVICE, INDUSTRIAL DEVICE AND CONTROL SYSTEM

TECHNICAL FIELD

The present disclosure generally relates to frictional brake devices of industrial devices. In particular, a method for recovery of a frictional brake device of an industrial device, and an industrial device comprising a brake device, are provided.

BACKGROUND

Various types of industrial devices include brake devices. In addition to, for example, workpiece positioners, conveyors and motor units, a common industrial device comprising brake devices is an industrial robot. An industrial robot may comprise a plurality of joints or axes, such as six or seven joints. At each joint, one member is movable relative to another member. Movements of the joints are typically provided by electric motors. The motion of a joint is accelerated and retarded by regulating the speed of the motor. During normal operation, the joint may be retarded only by the motor. Each joint is however typically equipped with a brake device in order to achieve a larger braking torque, for example in the case of emergency braking. The brake device may also serve to hold a static load on the joint, for example in the case of a power loss, in the case of disengagement of a servo during longer standstills, or in the case of leaving an automatic operation mode. The brake device may be arranged inside the motor or elsewhere.

The brake devices are often subjected to a low amount of wear since the joints are typically stopped by the motors only. When a joint movement has come to a standstill, the brake device is engaged. The performance of the brake device may be negatively influenced by dust and oxidation on surfaces of the brake device, e.g. surfaces of the brake disk and/or armature plate. In addition, the performance of the brake device may be negatively influenced by other friction reducing factors, such as aging. One solution to restore the braking function is to replace the brake device. This is an expensive and time consuming hurdle.

U.S. Pat. No. 9,537,431 B2 discloses a brake diagnosis device configured to diagnose a brake of a motor with a brake. The brake diagnosis device includes a brake control part, a diagnosis part, and a signal output part. The brake control part is configured to actuate or release the brake. The diagnosis part is configured to diagnose a presence or absence of an abnormality of the brake while the brake is actuated by the brake control part. The signal output part is configured to output a signal related to a brake abnormality after the brake is released by the brake control part in a case that the diagnosis part diagnoses the brake as having an abnormality.

SUMMARY

One object of the present disclosure is to provide a simple and reliable method for improving or conserving the functionality of one or more frictional brake devices of an industrial device.

A further object of the present disclosure is to provide a controlled recovery of one or more frictional brake devices of an industrial device.

A still further object of the present disclosure is to avoid the need for replacing one or more frictional brake devices of an industrial device.

A still further object of the present disclosure is to provide an industrial device solving one, several or all of the foregoing objects.

According to one aspect, there is provided a method for recovery of a frictional brake device of an industrial device, the method comprising executing a recovery operation, the recovery operation comprising at least one movement of a second member of the industrial device relative to a first member of the industrial device, while engaging the brake device to apply braking energy to the movement; monitoring an actual value related to braking energy of the brake device during the recovery operation, the actual value being not related to speed of the movement; and stopping the recovery operation when the actual value reaches at least one target value. The actual value is explicitly disclosed to be not related to the speed of the movement in order to exclude anti-lock brake systems (ABS). In the method, in contrast to ABS systems, the brake device may furthermore be continuously engaged during the movement. ABS systems as such are furthermore explicitly excluded from the scope of the appended claims, but it is not excluded that the claims cover methods related to brake devices with ABS and/or industrial devices comprising brake devices with ABS.

Thus, the method constitutes a way of wearing the brake device in a controlled manner. The method provides for a recovery of malfunctioning or less functioning brake devices of the industrial device. Throughout the present disclosure, the recovery operation may be referred to as a braking operation.

As soon as the actual value related to braking energy reaches the at least one target value, the recovery operation stops. Thereby, it can be ensured that a suitable amount of braking energy is applied. A too low braking energy may lead to an insufficient recovery of the brake device. A too high braking energy may lead to unnecessary wear or damage of the brake device. The applied braking energy may be controlled during the recovery operation. Throughout the present disclosure, the target value related to braking energy may alternatively be referred to as an energy parameter.

The method may be applied for a wide range of industrial devices. Non-limiting examples of industrial devices according to the present disclosure include workpiece positioners, conveyors, motor units and industrial robots. These industrial devices also constitute industrial actuators. Thus, an industrial device according to the present disclosure may be constituted by an industrial actuator.

The method according to the present disclosure may for example be constituted by a method for recovery of a frictional brake device of a workpiece positioner, a conveyor, a motor unit and/or an industrial robot. An industrial robot constitutes an industrial device and an industrial actuator as such. Each joint of an industrial robot also constitutes an industrial device and an industrial actuator. The method may be carried out with or without a load applied on the industrial device.

The first member and the second member may constitute two relatively movable members of a joint or axis of the industrial device, e.g. a proximal link member and a distal link member (or vice versa) of a joint of an industrial robot. The industrial device may comprise one or more joints, for example six or seven joints when constituted by an industrial robot. The movement of the second member relative to the first member may be either a rotational movement or a translational movement.

The recovery operation may comprise at least one first movement in a first direction of the second member relative to the first member, while engaging the brake device; and at least one second movement in a second direction, opposite to the first direction, of the second member relative to the first member. The method may further comprise teaching the industrial device a first position of the second member relative to the first member and a second position of the second member relative to the first member. In this case, the first movement may be constituted by a movement from the first position to the second position and the second movement may be constituted by a return movement from the second position back to the first position.

The first movement may be assisted by gravity, and the second movement may be counteracted by gravity, while disengaging the brake device. Thus, the first movement may be constituted by a downward movement, with reference to a gravity direction, while engaging the brake device, and the second movement may be constituted by an upward movement, with reference to the gravity direction. In this manner, the gravity can be used to facilitate the addition of braking energy to the brake device and/or to enable a powerful grinding of the brake device. A gravity assisted movement may for example be achieved by a joint rotatable about a horizontal axis.

The brake device may be engaged during the second movement. It may be the case that the second member of some joints of an industrial robot or other industrial device cannot move downwards, or can only move slightly downwards. In other words, the movements of some second members are not (or less) assisted by the gravity. For example, in many industrial robots, the first joint comprises a first link member rotatable about a vertical axis relative to a stationary base member. In these cases, the recovery operation may comprise moving the second member with the brake device engaged in both the first direction and in the second direction. An initiating operation according to the present disclosure may be executed prior to each movement of the second member with the brake device engaged in the first direction and in the second direction.

The recovery operation may comprise a plurality of sequences of the first movement and the second movement. Thus, the second member may be repeatedly moved, e.g. alternatingly moved in the first direction and the second direction, until the actual value reaches the target value.

The actual value and the at least one target value may be constituted by a temperature, a braking torque, a braking force, a braking energy, a braking power, a braking time, an angular distance of the second member relative to the first member, a translation distance of the second member, or combinations thereof. These actual values may for example be obtained from, or derived from, a function for measuring the braking torque of the brake device, positions, movements and/or accelerations of the first member and the second member, one or more temperature sensors etc. Each of these target values can be met with different speeds (or varying speed) of the movement. Thus, these target values are not related to the speed of the movement.

Each of the actual value and the at least one target value may comprise an energy value and a power value. In this case, both the energy target value and the power target value can be used to control the temperature and wear of the brake device. A higher power target value will give a higher temperature as more braking energy is generated in a shorter time.

The method may further comprise setting the at least one target value. The at least one target value may be set such that the recovery operation produces enough wear and/or temperature. If the brake device is polluted with particles, a target temperature may be set such that carbonization, evaporation, absorption etc. of unwanted particles is facilitated. According to one example, the target temperature for the recovery operation may be set to 150° C. or higher. Oxidation layers and aging layers are typically easier to remove. In these cases, lower target temperatures may be used for the recovery operation. By setting the at least one target value, the method can be optimized for different recovery procedures, i.e. the method is made flexible for different recovery scenarios.

The method may further comprise estimating a condition of the brake device, and the setting of the at least one target value may be based on the estimation. The estimation may be made based on historic operation data of the brake device and/or of the industrial device. The method may thus further comprise a function of keeping track of the total braking energy that has been applied by each brake device of the industrial device, i.e. also during normal operation of the industrial device. In this manner, the wear of the brake device can be supervised. The total braking energy may be constituted by the total energy applied since a successful refurbishment or recovery of the brake device. When it is determined, based on the total braking energy, that the brake device needs to be recovered, the method may be executed again. A reminder for execution of the method may be issued. Thereby, it can be ensured that the brake device is frequently engaged or frequently more extensively engaged.

The method may further comprise determining a free movement space within the environment of the industrial device; and executing the recovery operation within the free movement space. In this manner, interference with obstacles in the environment of the industrial device can be avoided.

The method may further comprise determining, after stopping the recovery operation, whether a condition of the brake device satisfies an expected condition; and executing the recovery operation again if the determined condition of the brake device does not satisfy the expected condition. The method may further comprise setting at least one target value related to braking energy of the brake device again if the determined condition of the brake device does not satisfy the expected condition. The determination may for example be made by a service engineer with a testing program, e.g. a "Cyclic Brake Check" (CBC) presently available in some ABB robots. If the functionality of the brake device is acceptable, the industrial device may resume its normal operation. Otherwise, another round of recovery is initiated.

The method may further comprise executing an initiating operation prior to the recovery operation, the initiating operation comprising an initiating movement of the second member relative to the first member, while disengaging the brake device, such that the recovery operation is initiated while the second member is moving. The recovery operation may thus be started when the brake device is engaged. The initiating operation thus provides a delay of the start of the recovery operation and a "higher than allowed torque" of a joint, due to engagement of the brake device when the joint is stationary, can be avoided. In this manner, the initiation of the recovery operation can be facilitated.

According to a further aspect, there is provided an industrial device comprising a first member; a second member movable relative to the first member; and a brake device configured to apply braking energy to the movement of the second member relative to the first member; wherein the industrial device is configured to execute a recovery operation, the recovery operation comprising at least one movement of the second member relative to the first member, while engaging the brake device to apply braking energy to the movement; monitor an actual value related to braking energy of the brake device during the recovery operation, the actual value being not related to speed of the movement; and stopping the recovery operation when the actual value reaches at least one target value. The industrial device may further be configured to carry out any method according to the present disclosure. The industrial device according to this aspect may for example be constituted by a workpiece positioner, a conveyor, a motor unit and/or an industrial robot.

According to a further aspect, there is provided a control system for an industrial device comprising a first member, a second member movable relative to the first member, and a brake device configured to apply braking energy to the movement of the second member relative to the first member, the control system comprising a data processing device and a memory having a computer program stored thereon, the computer program comprising program code which, when executed by the data processing device, causes the data processing device to perform the steps of commanding the industrial device to execute a recovery operation, the recovery operation comprising at least one movement of a second member of the industrial device relative to a first member of the industrial device while engaging the brake device to apply braking energy to the movement; commanding the industrial device to monitor an actual value related to braking energy of the brake device during the recovery operation, the actual value being not related to speed of the movement; and commanding the industrial device to stop the recovery operation when the actual value reaches at least one target value. The computer program may comprise program code which, when executed by the data processing device, causes the data processing device to command execution of any method according to the present disclosure.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
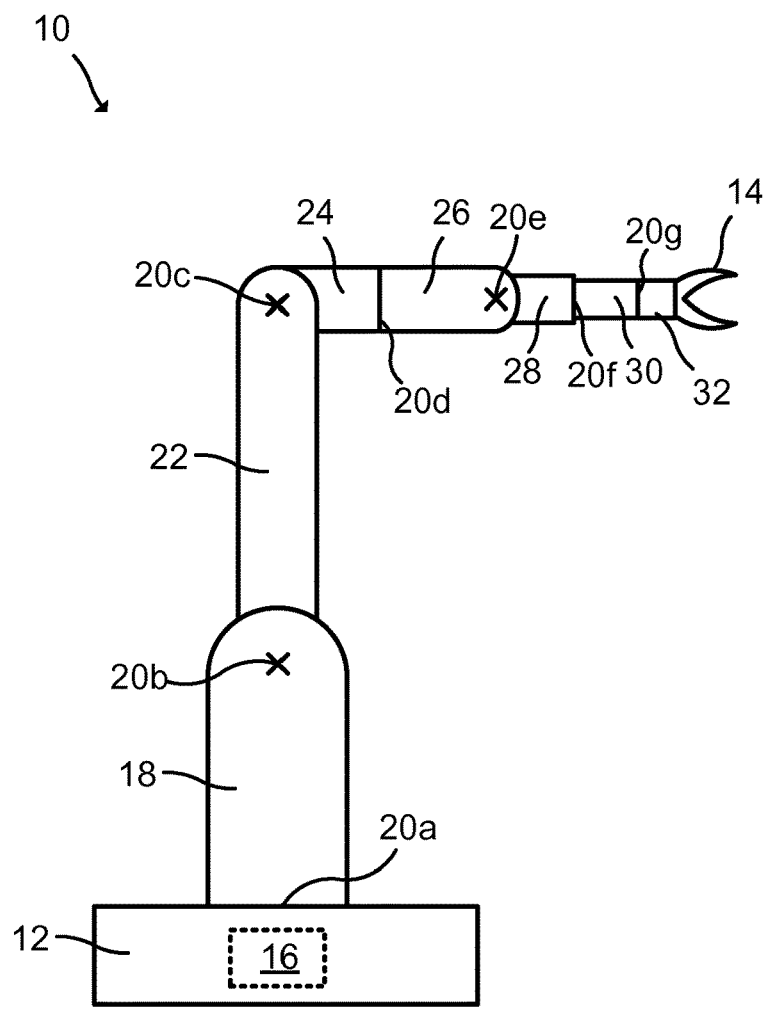
FIG. 1: schematically represents a side view of an industrial robot.

In the following, a method for recovery of a frictional brake device of an industrial device, and an industrial device comprising a brake device, will be described. The same reference numerals will be used to denote the same or similar structural features.

FIG. 1 schematically represents a side view of an industrial robot 10. The industrial robot 10 constitutes one example of an industrial device according to the present disclosure. Non-limiting alternative types of industrial devices according to the present disclosure include workpiece positioners, conveyors, and motor units.

The industrial robot 10 is exemplified as a seven axis industrial robot but the present disclosure is not limited to this type of robot. An industrial robot according to the present disclosure may comprise at least three axes.

The industrial robot 10 of this example comprises a base member 12, a tool 14, and a control system 16, such as a robot controller. The industrial robot 10 further comprises a first link member 18 distal of the base member 12 and rotatable around a vertical axis relative to the base member 12 at a first joint 20a, a second link member 22 distal of the first link member 18 and rotatable around a horizontal axis relative to the first link member 18 at a second joint 20b, a third link member 24 distal of the second link member 22 and rotatable around a horizontal axis relative to the second link member 22 at a third joint 20c, a fourth link member 26 distal of the third link member 24 and rotatable relative to the third link member 24 at a fourth joint 20d, a fifth link member 28 distal of the fourth link member 26 and rotatable relative to the fourth link member 26 at a fifth joint 20e, a sixth link member 30 distal of the fifth link member 28 and translationally movable relative to the fifth link member 28 at a sixth joint 20f, and a seventh link member 32 distal of the sixth link member 30 and rotatable relative to the sixth link member 30 at a seventh joint 20g. The seventh link member 32 comprises an interface (not denoted) to which the tool 14 is attached. A brake device according to the present disclosure may be provided at one, several or each of the joints 20a-20g. Also each joint 20a-20g (also referred to as "20") constitutes an industrial device according to the present disclosure.

Figure 2:
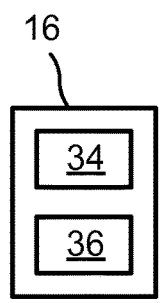
FIG. 2: schematically represents a control system.

FIG. 2 schematically represents one example of control system 16 of the industrial robot 10 in FIG. 1. The control system 16 comprises a data processing device 34 (e.g. a central processing unit, CPU) and a memory 36. A computer program is stored in the memory 36. The computer program may comprise program code which, when executed by the data processing device 34, causes the data processing device 34 to command execution of any method according to the present disclosure.

Figure 3A:
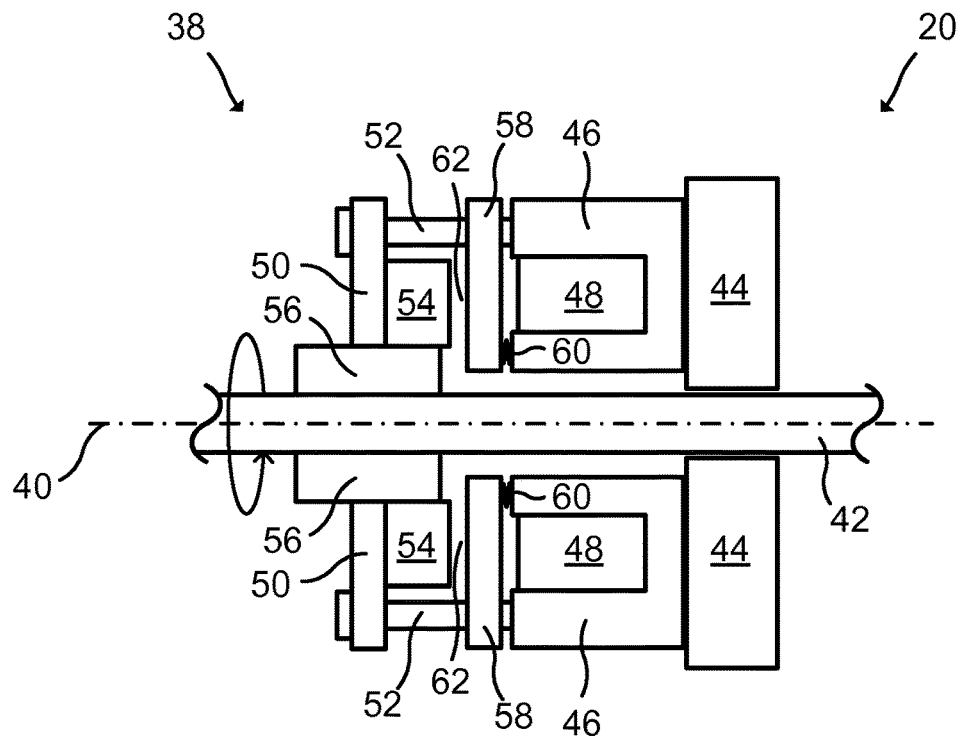
FIG. 3a: schematically represents a cross-sectional side view of a brake device in a disengaged state.

FIG. 3a schematically represents a cross-sectional side view of one example of a brake device 38. The brake device 38 of this example is a power off brake, i.e. the brake device 38 stops or holds a load when electrical power is either accidentally lost or intentionally disconnected.

The brake device 38 serves to apply braking energy to relative rotational movements about a rotational axis 40 between a second member 42 and a first member 44. For example, in case the brake device 38 is arranged in the second joint 20b of the industrial robot 10, the first member 44 may be constituted by, or be rigidly connected to, the first link member 18 and the second member 42 may be constituted by, or be rigidly connected to, the second link member 22. Brake devices according to the present disclosure are however not limited to power off brakes or to rotational brakes.

The brake device 38 of this example comprises a magnet body 46 fixedly connected to the first member 44. The magnet body 46 houses a coil 48. The magnet body 46 and the coil 48 are annular and enclose the second member 42. The brake device 38 further comprises an annular stationary plate 50 (i.e. stationary with respect to the first member 44) and a plurality of guide rods 52. The stationary plate 50 is held fixed relative to the magnet body 46 by means of the guide rods 52.

The brake device 38 further comprises an annular rotatable frictional brake disk 54. The brake disk 54 is connected to the second member 42 via a hub 56. The brake device 38 further comprises an annular armature plate 58, guided parallel with the rotational axis 40 by means of the guide rods 52, and a plurality of elastic elements 60, here implemented as compression springs. The elastic elements 60 are compressed and exert a force on the armature plate 58 towards the brake disk 54.

In FIG. 3*a*, the brake device 38 adopts a disengaged state. Current is applied to the coil 48 such that a magnetic field is generated. The magnetic field attracts the armature plate 58 towards the magnet body 46 against the compression of the elastic elements 60. An air gap 62 is thereby established between the brake disk 54 and the armature plate 58. In this state, the brake disk 54 will also lose the pressed contact with the stationary plate 50 since the brake disk 54 is allowed to slightly move axially.

Figure 3B:
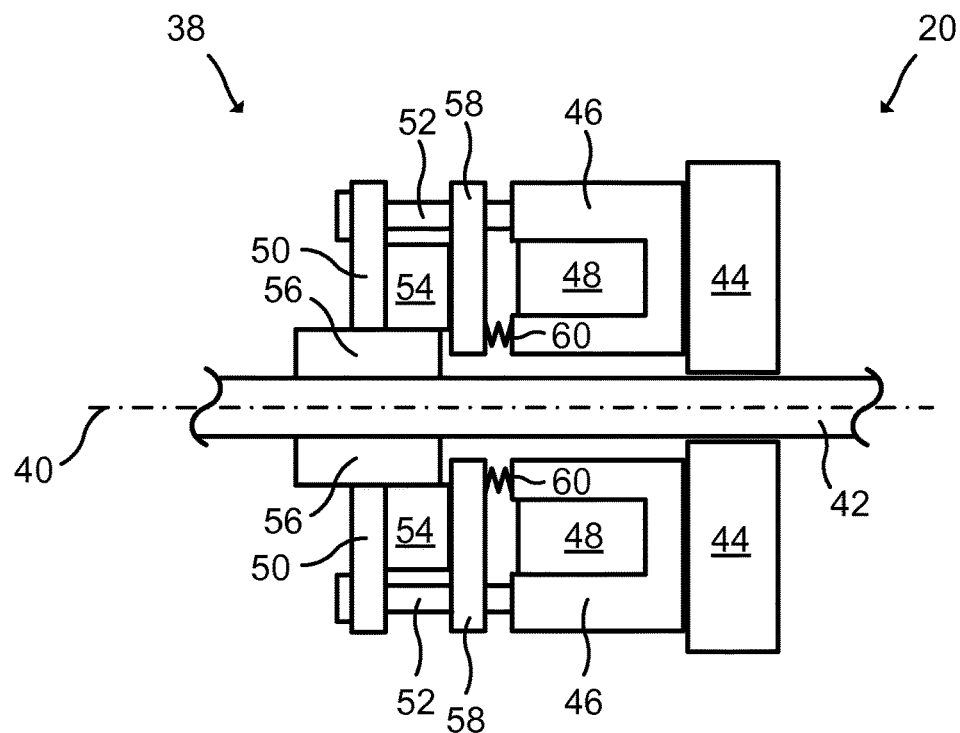
FIG. 3b: schematically represents a cross-sectional side view of the brake device in an engaged state.

FIG. 3*b* schematically represents a cross-sectional side view of the brake device 38 in an engaged state. In the engaged state, no current is applied to the coil 48 and no magnetic field is thereby generated. The elastic elements 60 push the armature plate 58 into engagement with the brake disk 54 and frictional braking energy is thereby generated.

One example of a method for recovery of a frictional brake device 38 according to the present disclosure will now be described. Many of the steps in this example are optional and it is intended that the method is limited only by the claims.

As a first step, a condition of one or more brake devices 38 of the industrial robot 10 (or other industrial device) may be estimated. In other words, it may be determined whether any of the brake devices 38 needs to be recovered. This determination may be entirely manual, e.g. based upon detection by a service engineer, or automatic, e.g. based on historic operation data of the brake device 38 and/or the industrial robot 10. For example, the control system 16 may be provided with a function that keeps track of the total braking energy that has been applied by each brake device 38. Based on the function, it may be determined that brake devices 38 that have not applied any braking energy, or have applied only a low amount of energy, need recovery.

A target value related to braking energy of the brake device 38 may then be set. The setting of the target value may be based on the estimated condition of the brake device 38, for example based on the function keeping track of the total braking energy by the brake device 38, or based on a manually estimated condition. If the brake device 38 has not been used at all for a time period, a certain condition of the brake device 38 may be assumed. If the brake device 38 has only been used to a low extent, another condition of the brake device 38 may be assumed etc. Other parameters may also be taken into account in order to estimate (either automatically and manually) the condition of the brake device 38, for example air humidity, level of air contamination and temperature in the environment of the industrial robot 10. The target value may be set manually or automatically. Alternatively, a predefined target value may be used.

Various types of target values related to braking energy are possible. Examples of target values include a target temperature (either measured or calculated), a target braking torque, a target braking force, a target braking energy, a target braking power, a target braking time, a target angular distance of the second member 42 relative to the first member 44 etc., and any combinations thereof. For some recovery procedures, it may be desired to obtain a certain temperature at the armature plate 58 and the brake disk 54. In this case, a target temperature value may be used. Alternatively, an energy target value in combination with a power target value may be used. For some recovery procedures, a target braking force may be more suitable, optionally in combination with a target braking time.

A free movement space within the environment of the industrial robot 10 for a recovery operation may then optionally be determined such that the joint gets enough room for movement. In this way, a large movement range for the recovery operation can be allowed while avoiding collisions with surrounding objects, or with the industrial robot 10 itself.

At least one first movement of the second member 42 relative to the first member 44 may then be determined. This first movement may be programmed in advance, determined automatically by the robot (e.g. based on the determination of a free movement space), or programmed ad hoc when a recovery procedure is to be carried out, e.g. by manually teaching a first position and a second position.

A recovery operation for the recovery of the brake device 38 may then be executed. The recovery operation comprises the at least one first movement of the second member 42 relative to the first member 44 with the brake device 38 engaged such that braking energy is applied to the movement. The recovery operation may comprise a second return movement either with engaged or disengaged brake device 38. During the recovery operation, an actual value related to braking energy of the brake device 38 is monitored. Thereby, a controlled wear of the brake device 38 is generated to accomplish a desired recovery. The actual value is explicitly disclosed to be not related to, i.e. independent of, the speed of the movement in order to exclude ABS systems.

The applied braking energy may also be controlled during the recovery operation. In this way, the temperature build-up during the recovery operation can be determined. A too high braking power could lead to too high local temperature rises in the brake device 38.

In order to facilitate the start-up of the recovery operation, an initiating operation may be executed prior to the recovery operation, e.g. prior to the first movement. The initiating operation may comprise accelerating the second member 42 relative to the first member 44 from standstill to a target speed. Once the target speed has been reached, the recovery operation is initiated. In this way, the initiation of the recovery operation is facilitated, i.e. the motor of the joint requires a lower torque to move the second member 42 while engaging the brake device 38 in comparison with a start from standstill. Instead of when reaching a target speed, the recovery operation may be initiated after a time limit from the start of the acceleration of the second member 42 relative to the first member 44 from standstill.

The first movement of the second member 42 relative to the first member 44 may be a downward gravity assisted movement, while engaging the brake. For example, in case a recovery procedure is to be carried out for a brake device 38 associated with the third joint 20*c* of the industrial robot 10, the third link member 24 (here constituting a second member 42) may be rotated downwards relative to the second link member 22 (here constituting the first member 44) while engaging the brake device 38. The braking can thereby be made more forceful due to the gravity acting on the third link member 24 (and on the parts distal of the third link member 24). A second movement may then be constituted by an upward movement of the third link member 24 relative to the second link member 22 while disengaging the brake device 38.

For recovery of a brake device 38 associated with the first joint 20*a*, i.e. between the first link member 18 (here constituting a second member 42) and the base member 12 (here constituting a first member 44), the first movement may be constituted by a rotation of the first link member 18 in a first direction about a vertical axis and the second movement may be constituted by a rotation of the first link member 18 in a second opposite direction about the vertical axis. In this case, the brake device 38 may be engaged both during the first movement and during the second movement. Furthermore, an initiating operation may be executed prior to each movement in the first direction and prior to each movement in the second direction.

In any case, the recovery operation may comprise a plurality of sequences of the first movement and the second movement. Once the actual value related to braking energy reaches the at least one target value, the recovery operation is stopped. The stopping may take place during the first movement for the first time, or during any subsequent movement, such as after several sequences of first movements and second movements.

Once the recovery operation has stopped, it may be determined whether a condition of the brake device 38 satisfies an expected condition. If so, normal operation of the industrial robot 10 may be resumed. If not, a further recovery operation may be executed, optionally by setting a new target value related to braking energy of the brake device 38.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method for recovery of a frictional brake device of an industrial device, the method comprising:
executing a recovery operation, the recovery operation including, at least one movement of a second member of the industrial device relative to a first member of the industrial device, while engaging the brake device to apply braking energy to the movement;
monitoring an actual value related to braking energy of the brake device during the recovery operation, the actual value being not related to speed of the movement; and
stopping the recovery operation when the actual value reaches at least one target value,
wherein the recovery operation includes:
at least one first movement in a first direction of the second member relative to the first member, while engaging the brake device; and
at least one second movement in a second direction, opposite to the first directions, of the second member relative to the first member.

2. The method according to claim 1, wherein the first movement is assisted by gravity, and wherein the second movement is counteracted by gravity, while disengaging the brake device.

3. The method according to claim 1, wherein the brake device is engaged during the second movement.

4. The method according to claim 2, wherein the recovery operation comprises a plurality of sequences of the first movement and the second movement.

5. The method according to claim 1, wherein the actual value and the at least one target value are constituted by a temperature, a braking torque, a braking force, a braking energy, a braking power, a braking time, an angular distance of the second member relative to the first member, a translation distance of the second member, or combinations thereof.

6. The method according to claim 1, wherein each of the actual value and the at least one target value includes an energy value and a power value.

7. The method according to any of the preceding claim 1, further comprising setting the at least one target value.

8. The method according to claim 7, further comprising estimating a condition of the brake device, and wherein the setting of the at least one target value is based on the estimation.

9. The method according to claim 8, wherein the estimation is made based on historic operation data of the brake device and/or of the industrial device.

10. The method according to claim 1, further comprising:
determining a free movement space within the environment of the industrial device; and
executing the recovery operation within the free movement space.

11. The method according to claim 1, further comprising:
determining, after stopping the recovery operation, whether a condition of the brake device satisfies an expected condition; and
executing the recovery operation again if the determined condition of the brake device does not satisfy the expected condition.

12. The method according to claim 1, further comprising:
executing an initiating operation prior to the recovery operation, the initiating operation including an initiating movement of the second member relative to the first member, while disengaging the brake device, such that the recovery operation is initiated while the second member is moving.

13. An industrial device comprising:
a first member;
a second member movable relative to the first member; and
a brake device configured to apply braking energy to the movement of the second member relative to the first member;
wherein the industrial device is configured to:
execute a recovery operation, the recovery operation including at least one movement of the second member relative to the first member, while engaging the brake device to apply braking energy to the movement;
monitor an actual value related to braking energy of the brake device during the recovery operation, the actual value being not related to speed of the movement; and
stopping the recovery operation when the actual value reaches at least one target value; and
wherein the recovery operation includes:
at least one first movement in a first direction of the second member relative to the first member, while engaging the brake device; and
at least one second movement in a second direction, opposite to the first direction, of the second member relative to the first member.

14. The industrial device according to claim 13, wherein the industrial device is an industrial robot.

15. The method according to claim 2, wherein the actual value and the at least one target value are constituted by a temperature, a braking torque, a braking force, a braking energy, a braking power, a braking time, an angular distance of the second member relative to the first member, a translation distance of the second member, or combinations thereof.

16. The method according to claim 2, wherein each of the actual value and the at least one target value includes an energy value and a power value.

17. The method according to claim 2, further comprising setting the at least one target value.

\* \* \* \* \*